# United States Patent Office 3,405,024
Patented Oct. 8, 1968

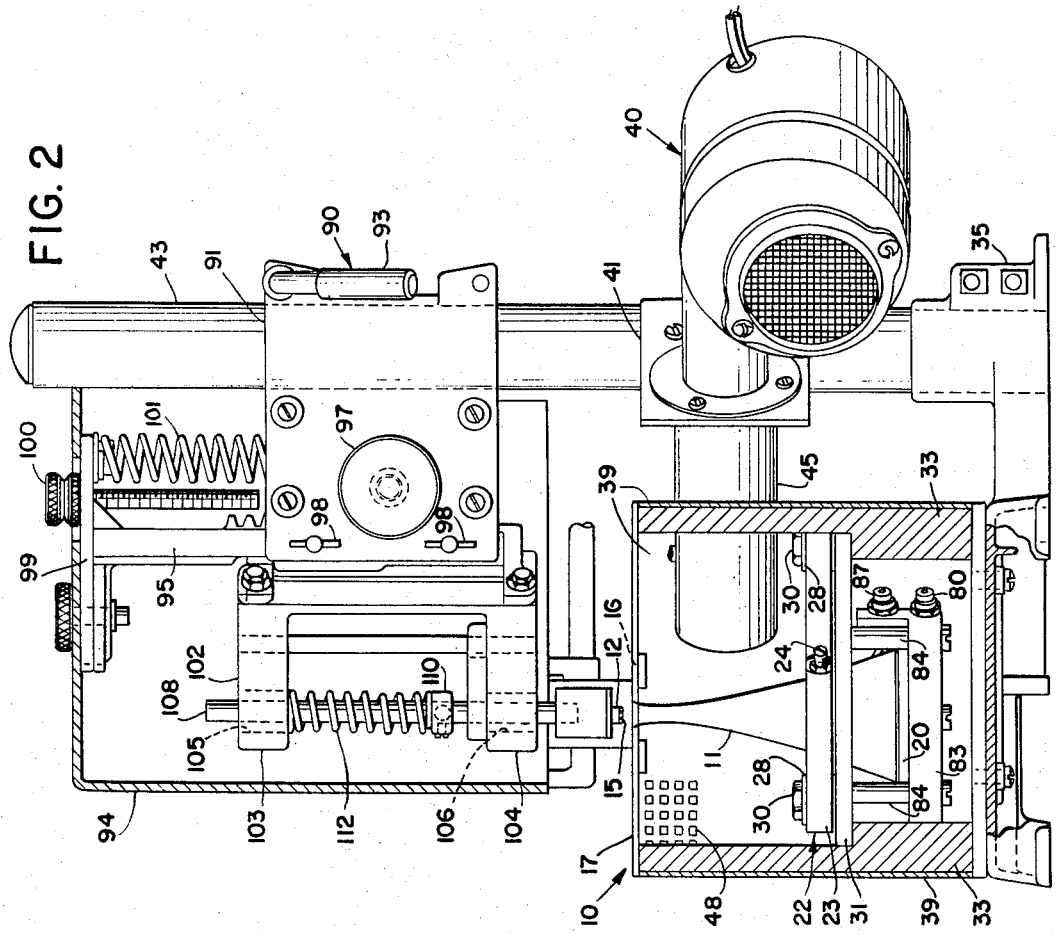
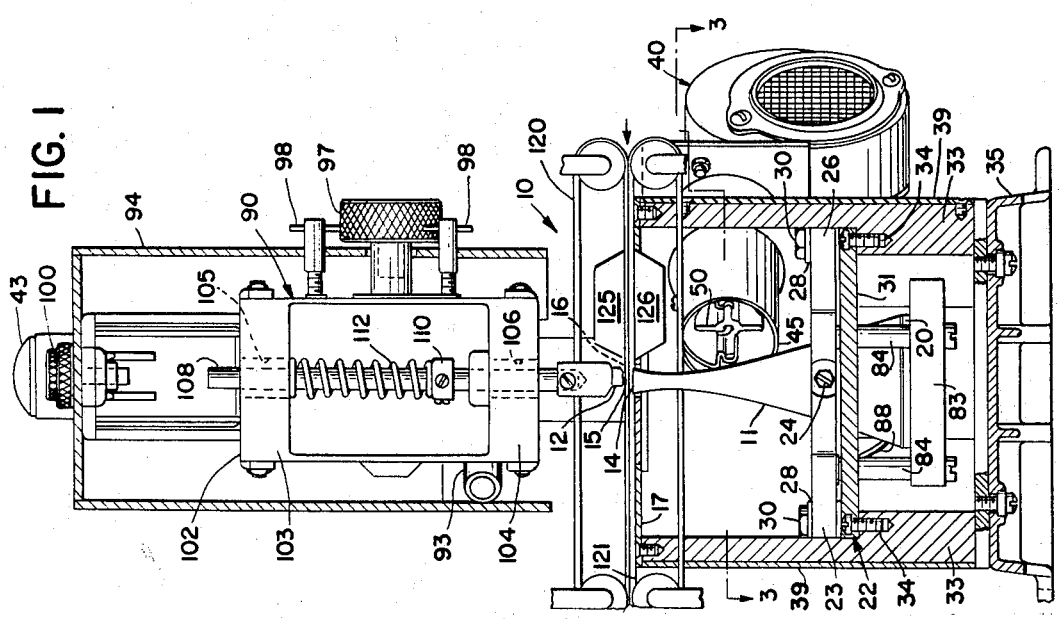

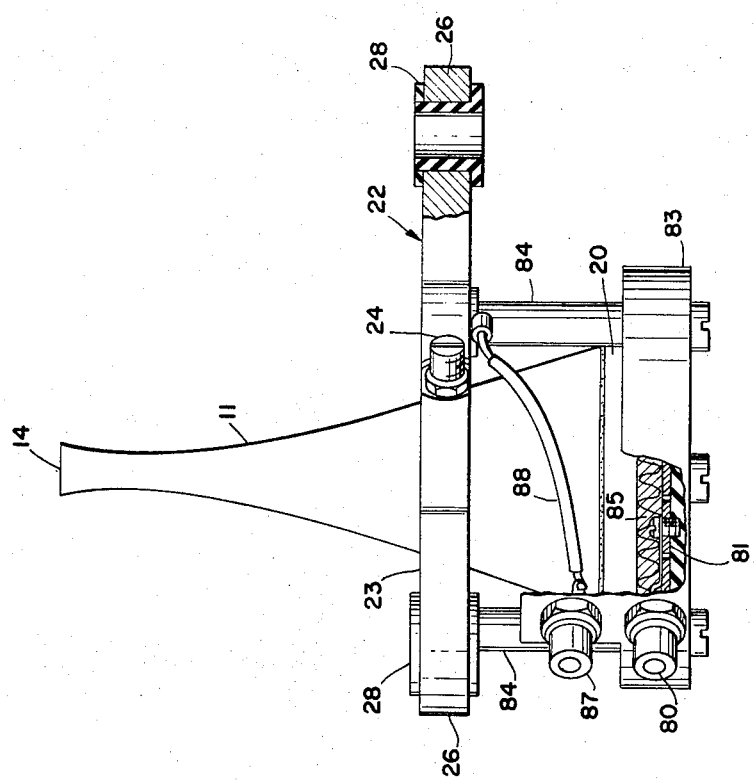
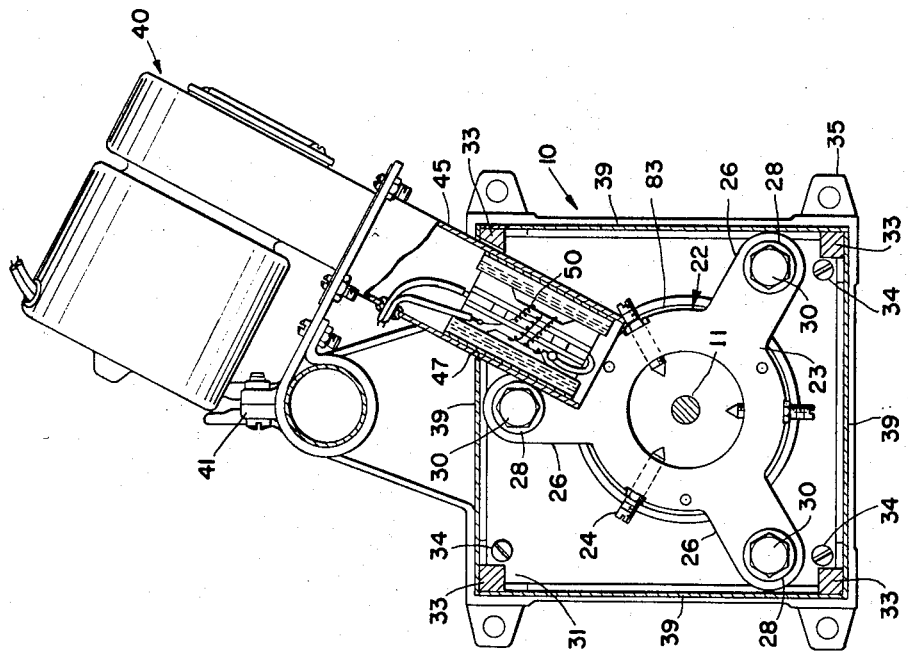

3,405,024
METHOD AND APPARATUS FOR FORMING ULTRASONIC SEALS
John G. Attwood, Oak Park, and Robert L. Kosrow, Elk Grove Village, Ill., assignors to Union Special Machine Company, Chicago, Ill., a corporation of Illinois
Filed Jan. 13, 1965, Ser. No. 425,231
21 Claims. (Cl. 156—73)

ABSTRACT OF THE DISCLOSURE

A temperature control system for an ultrasonic bonding tool having opposed jaws in the form of a vibratory horn and a stationary anvil. Prior to the bonding operation, the horn is heated to an elevated temperature. Upon the vibration of the horn at its natural resonant frequency, the application of heat is arrested, and the horn is cooled to offset the tendency of the vibrations to generate heat internally. The arrangement is such that the horn is held at a substantially constant temperature both before and during the application of vibratory energy thereto.

---

This invention relates to a method and apparatus for joining pieces of material and more particularly to a method and apparatus for bonding the material through the use of ultrasonic techniques.

Ultrasonic bonding methods and apparatus of the type to which the present invention are directed, while of general application, are particularly well suited for joining together pieces of thermoplastic material by means of a transducer which is effective to apply vibratory energy to a horn or other vibratory member having a natural mechanical resonant frequency. This resonant frequency is usually above the upper range of the audible spectrum and illustratively lies between about twenty thousand cycles per second and several hundred thousand cycles per second or even higher. The transducer is supplied with alternating current to induce vibrations of the compressional wave energy type in the horn. A portion of these vibrations is reflected by boundaries such as interfaces to produce standing wave patterns which include one or more zones or nodes of minimum motion at one-half wavelength intervals and other zones or antinodes of maximum motion at distances of one-quarter wavelength from an adjacent node. To minimize energy losses by absorption, the horn customarily is supported at a node, and the longitudinal dimension of the horn is such that its smaller end terminates at an antinode to provide vibrations of maximum amplitude.

Heretofore, methods and apparatus of the foregoing type have exhibited several disadvantages. As an illustration, for optimum efficiency the frequency of the alternating current supplied to the transducer advantageously corresponds as closely as possible to the natural resonant frequency of the horn, and it is therefore desirable to maintain variations in the resonant frequency at a minimum. However, with a horn of predetermined configuration and material, the resonant frequency is subject to change in response to variations in temperature which result primarily from the physical loading of the horn. In the bonding of thermoplastic material to form a comparatively long seam, for example, the temperature of horns of the type previously employed often increased substantially during the formation of the seam because of conduction effects and also as a result of internal loss. This increase in temperature produced longitudinal expansion of the horn which adversely affected the stability of its resonant frequency and impaired the matching of the horn frequency with that of the alternating current supply. In addition, the increase in the length of the horn resulted in a narrower operating gap with a corresponding increase in the pressure applied to the seam, thus producing a non-uniform seam and necessitating a higher power input. Furthermore, and this has been of special moment in cases in which the seam was formed at a comparatively rapid rate, difficulties were encountered heretofore in providing satisfactory seals particularly on thermoplastic bags and other filled containers.

One general object of this invention, therefore, is to provide a novel and economical method and apparatus for bonding pieces of material through the use of ultrasonic techniques.

More specifically, it is an object of this invention to provide such method and apparatus wherein variations in the temperature of the vibratory member, and hence in its natural resonant frequency, are maintained at a minimum.

Another object of the invention is to provide a method and apparatus of the character indicated for producing an extremely uniform seam between the pieces of material being joined together.

A further object of the invention is to provide a process for facilitating the formation of ultrasonic seals on thermoplastic bags and other filled containers.

Still another object of the invention is to provide a new and improved apparatus for joining pieces of material which is economical to manufacture and thoroughly reliable in operation.

In one illustrative embodiment of the invention, the pieces of material to be joined are positioned in an ultrasonic vibratory tool between a pair of jaws formed by a stationary member and a horn or cone. Unique temperature control means are employed to heat the horn to a predetermined temperature. The horn is vibrated at an ultrasonic resonant frequency to transmit vibratory energy to the pieces and thereby form a uniform and smooth bond therebetween.

In accordance with one feature of the invention, in several particularly advantageous embodiments, the application of heat to the horn is arrested prior to the time the horn is vibrated to form the ultrasonic seal. During the formation of the seal, the temperature control means is effective to cool the horn and thus maintain it at a controlled temperature. With this arrangement, the deleterious effects of temperature changes on the horn's natural resonant frequency are maintained at a minimum.

In accordance with another feature of the invention, in certain good arrangements, the predetermined temperature of the horn prior to the sealing operation is substantially equal to its controlled temperature during the application of vibratory energy to the pieces being joined. The arrangement is such that the horn is maintained at a substantially constant temperature both before and during the sealing operation to further reduce the possibility of variations in its natural resonant frequency.

In accordance with a further feature of certain embodiments of the invention, the pieces of material to be joined are preconditioned prior to the formation of the seal by increasing their temperature. The use of such preconditioning is particularly effective in the sealing of bags and other filled containers, for example, or in situations in which it is desired to form the seals at increased speeds.

The present invention, as well as further objects and features thereof, will be understood more clearly and fully from the following description of certain preferred embodiments, when read with reference to the accompanying drawings, in which:

FIGURE 1 is a side elevational view of apparatus for ultrasonically bonding pieces of material in accordance with one illustrative embodiment of the invention, with certain parts shown in section and others broken away;

FIGURE 2 is an end elevational view of the apparatus as seen from the right in FIGURE 1, with certain parts shown in section and others omitted for purposes of clarity;

FIGURE 3 is a horizontal sectional view of the apparatus taken along the line 3—3 in FIGURE 1;

FIGURE 4 is a side elevational view of a portion of the apparatus, with certain parts shown broken away and in section;

Figure 5:
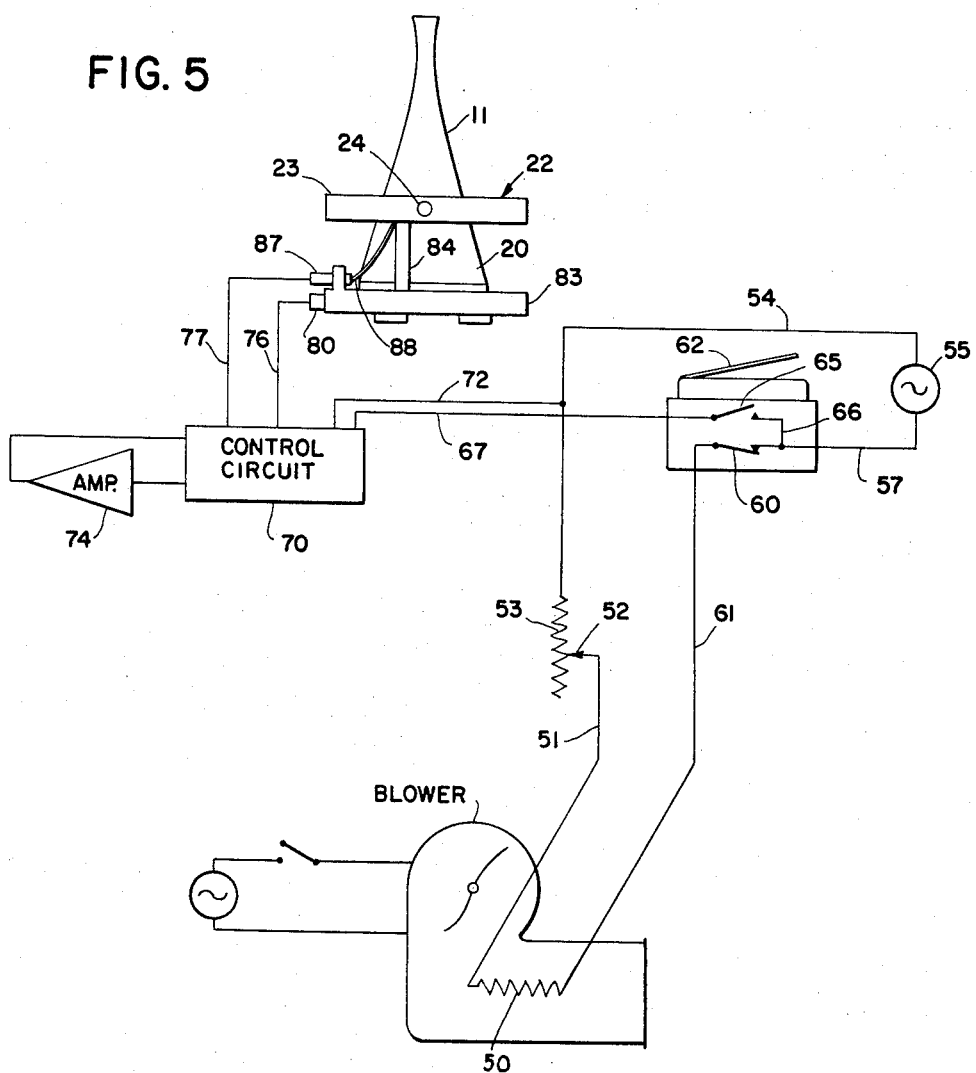
FIGURE 5 is a schematic representation of an electrical circuit for controlling the operation of the apparatus.

Referring to FIGURES 1 and 2 of the drawings, there is shown an apparatus for ultrasonically bonding pieces of thermoplastic sheet material which comprises an ultrasonic vibratory tool indicated generally at 10. The tool 10 includes a pair of opposed jaws 11 and 12 which are spaced apart in vertical alignment with each other to define a gap therebetween. The jaw 11 is in the form of an elongated horn-shaped member which is disposed about a vertical axis and is arranged for vibratory motion in a longitudinal mode. The horn is of tapered, generally conical configuration but is flared at its smaller upper end to provide a substantially flat horizontal surface 14 in facing relationship with an adjacent surface 15 at the lower end of the jaw 12. In the illustrated embodiments of the invention, the horn is of the exponential type, although in other advantageous arrangements horns of a non-exponential character and without the flared end portion are employed, again with good results. In addition, certain good embodiments include a series of small protrusions (not visible in FIGURES 1 and 2) on the facing surfaces 14 and 15 to enable the formation of the ultrasonic bond in preselected local areas therebetween.

The upper end of the horn 11 extends through an opening 16 in a horizontal table 17 which serves as a support for the pieces of material to be joined. The surface 14 is flush with the upper surface of the table.

A disk-shaped transducer element 20 is fixedly secured to the enlarged lower end of the horn 11. Although in some embodiments of the invention magnetostrictive-type transducers are employed with good effect, in the illustrated embodiments the transducer 20 advantageously comprises a piezoelectric crystal having a coating of silver or similar material on its opposed facing surfaces. The crystal is bonded to the horn by a suitable adhesive, such as epoxy cement, for example, which is provided with silver granules distributed therein to facilitate the transmission of electrical energy to the horn.

The horn 11 is dimensioned to provide a natural mechanical resonant frequency in the ultrasonic range. The reflection of a portion of the vibrations from the boundaries of the horn produces standing wave patterns having an antinode or zone of maximum motion adjacent its smaller upper end. This antinode is spaced one-quarter wavelength above a node intermediate the horn ends which exhibits little or no vibratory motion.

The horn 11 is supported at the node by a support unit 22. As best shown in FIGURES 3 and 4, the unit 22 includes an electrically conductive horizontal plate 23 of generally annular configuration which is provided with three inwardly extending pointed screws 24. These screws are arranged to bite into the side of the horn at the node and thereby provide a rigid support therefor without substantial effect on the horn's vibratory movement. Three integrally formed flanges 26 extend outwardly from the plate 23 and include grommets 28 of rubber or other non-conductive material adjacent their outer ends. The grommets 28 accommodate corresponding bolts 30 which connect the plate 23 to a generally rectangular support plate 31. This latter plate is arranged parallel to and immediately beneath the plate 23 and is provided with an enlarged centrally located aperture through which the horn extends.

The support plate 31 is affixed intermediate the ends of four upstanding legs 33 by screws 34. The legs 33 are welded or otherwise secured to a base member 35 and are provided with side panels 39 which substantially enclose the horn 11. The upper ends of the legs serve to support the horizontal table 17 (FIGURE 1).

The temperature of the horn 11 is controlled by a blower unit indicated generally at 40. The unit 40 is supported by a bracket 41 (FIGURE 2) which is affixed to an upstanding standard 43. This standard is mounted on the base member 35 in spaced relationship with the horn 11. The unit 40 includes a cylindrical discharge conduit 45 which extends horizontally through a circular opening 47 in one of the side panels 39. The discharge end of the conduit 45 is positioned in close juxtaposition with the horn 11 between the support unit 22 and the table 17. The side panel 39 on the side of the horn opposite that adjacent the conduit 45 is provided with a series of apertures 48 to insure the free circulation of air across the horn from the conduit. A heating element 50 is provided in the conduit and is arranged to apply heat to the circulated air at predetermined points in the operation cycle.

The heating element 50 is operated under the control of an electrical circuit shown schematically in FIGURE 5. One end of the element 50 is connected by a conductor 51 to the center tap 52 of a control rheostat 53. The rheostat 53 leads through a conductor 54 to one terminal of an alternating current source 55. The other terminal of this source is connected through a conductor 57, a normally closed switch 60 and a conductor 61 to the opposite end of the element 50. The switch 60 is controlled by a foot treadle 62 such that, upon movement of the treadle in a downward direction from the position shown, the switch is opened to break the circuit for the element 50.

The foot treadle 62 also serves to control the supply of vibratory energy to the horn 11 by the transducer element 20 through the operation of a normally open switch 65. One terminal of the switch 65 is connected to a branch conductor 66 leading through the conductor 57 to one side of the alternating current source 55, while the opposite terminal is connected by a conductor 67 to one of the input terminals of a control circuit 70. The other input terminal of the circuit 70 leads through a conductor 72 and the conductor 54 to the opposite side of the source 55. The arrangement is such that, upon operation of the foot treadle 62 to open the switch 60 and thereby disconnect the heating element 50, the switch 65 is closed to apply an alternating current signal from the source 55 to the circuit 70.

The signal received by the control circuit 70 is amplified by an amplifier 74. The signal is then returned to the circuit 70 and appears as an output signal which is supplied to the transducer element 20 by two conductors 76 and 77. Although a wide variety of control circuits are useful to produce the signal supplied to the transducer, one particularly advantageous circuit for this purpose is disclosed, for example, in the copending Attwood and Kosrow U.S. patent application Ser. No. 425,230 entitled "Control Circuit for Electro-Mechanical Devices" filed Jan. 13, 1965.

The output conductor 76 leads from the control circuit 70 to a jack 80. As best shown in FIGURE 4, the jack 80 is in electrically conductive relationship with a circular brass plate 81. This plate is supported in spaced relationship with the lower surface of the transducer element 20 by a dielectric member 83 which is suspended from the annular plate 23 by electrically conductive legs 84. As more fully described, for example, in the copending Attwood and Kosrow U.S. patent application Ser. No. 425,133 for "Vibratory Apparatus," filed Jan. 13, 1965, now Patent 3,350,582 granted Oct. 31, 1967, a wire mesh 85 rests on the plate 81 and serves to electrically interconnect the plate with the transducer element 20.

The output conductor 77 (FIGURE 5) extends from the control circuit 70 to a jack 87 which is supported on the dielectric member 83 immediately above the jack 80. The jack 87 is connected by a lead 88 to one of the legs 84 depending from the plate 23. An electrically conductive path is thereby established from the jack 87, the lead 88, the leg 84, the plate 23 and the pointed screws 24 to the exponential horn 11.

The jaw member 12 (FIGURES 1 and 2) is in the form of an anvil and is arranged in spaced juxtaposition with the horn 11. The jaw 12 is adjustably affixed to the standard 43 by a bracket assembly indicated generally at 90. This assembly includes a laterally extending arm 91 which is secured to the standard 43 by locking members 93. Upon the loosening of the locking members 93, the arm 91 is movable either upwardly or downwardly to produce corresponding movements of the jaw 12. The bracket assembly is substantially enclosed by a skirt member 94 in fixed relationship with the arm.

A vertically reciprocable rack 95 is carried in a cooperating track (not visible in FIGURES 1 and 2) adjacent the inwardly extending portion of the arm 91. The rack 95 is in meshing engagement with a pinion connected to a knurled knob 97 to enable manual movement of the rack 95 in a vertical direction with respect to the arm 91. During the seaming operation, this movement is prevented by two wing screws 98 which clamp the rack 95 to the arm 91. A flat horizontal plate 99 is affixed to the upper end of the rack 95 and is provided with an adjustable stop member 100 which extends downwardly therefrom to a position adjacent the upper surface of the arm 91. The member 100 serves to limit downward movement of the rack with respect to the arm. The rack is biased in a downward direction with respect to the arm by an elongated coil spring 101. The lower end of this spring bears against the upper horizontal surface of the arm, while its upper end is connected to the lower surface of the plate 99. Upon the loosening of the wing screws 98, the spring 101 draws the rack downwardly from its uppermost position (the position shown) until the member 100 engages the arm.

The rack 95 supports a generally C-shaped head 102. The arms 103 and 104 of the head 102 extend horizontally over the exponential horn 11 and are provided with aligned apertures 105 and 106, respectively. These apertures accommodate a vertically reciprocable rod 108 which is affixed to the jaw 12 at its lower end. A collar 110 is secured to the rod 108 intermediate the arms 103 and 104, and this collar supports the lower end of a comparatively strong coil spring 112. The spring 112 is disposed around the rod, and its upper end is affixed to the lower surface of the arm 103 to bias the rod and its attached jaw in a downward direction. The arrangement is such that, with the spring 112 in its fully expanded position, the lower face of the jaw is maintained in spaced relationship with the horizontal surface 14 on the horn 11.

In the formation of a bond or seam between the pieces of material to be joined, the apparatus is initially adjusted to establish an appropriate gap between the horn 11 and the jaw or anvil 12. This gap depends for the most part on the thickness of the pieces of material to be bonded together. A coarse adjustment of the gap is effected by loosening the locking members 93 and sliding the arm 91 upwardly or downwardly with respect to the standard 43 to similarly move the rack 95, the head 102, the spring 112, the rod 108 and the anvil 12 with respect to the horn 11. To provide a precise adjustment of the anvil 12 with respect to the horn 11, the wing screws 98 are loosened, and the knurled knob 97 is rotated to move the rack and the anvil in a vertical direction with respect to the horn to establish the gap. The threaded stop member 100 is then adjusted to prevent the anvil from approaching the horn closer than the desired gap setting.

Prior to the formaton of the seam, the blower 40 is operated to direct a stream of air from the discharge conduit 45 across the horn 11. Simultaneously, the heating element 50 is connected to the conductors 51 and 61 (FIGURE 5) leading to the alternating current source 55 to increase the temperature of the air moving across the horn 11. The setting of the center tap 52 for the rheostat 53 is such that the heated air directed across the horn 11 maintains the horn at a predetermined elevated temperature.

In some embodiments, the pieces of material to be bonded together are manually positioned in the tool between the horn 11 and the anvil 12. In other arrangements, however, the pieces of material are advanced in side-by-side abutting relationship with each other along the table 17 by a pair of endless conveyor belts 120 and 121. As these belts rotate, the material moves at a uniform rate toward the gap between the horn 11 and the anvil 12 and is positioned therebetween.

Upon the operation of the foot treadle 62 (FIGURE 5), the application of heat to the horn 11 is arrested, and the horn is simultaneously vibrated at its ultrasonic resonant frequency. The operation of the foot treadle is effective to close the switch 65 and thereby produce an alternating current signal at the output terminals of the control circuit 70 which has a frequency corresponding to the resonant frequency of the horn. This signal follows a path from the output conductor 76, the jack 80, the brass plate 81 (FIGURE 4) and the wire mesh 85 to the piezoelectric crystal 20 affixed to the lower surface of the horn. The circuit returns through the pointed screws 24, the annular plate 23, the leg 84, the conductor or lead 88, the jack 87 and the conductor 77 leading to the control circuit 70. The crystal 20 converts the electrical energy supplied thereto to mechanical energy to vibrate the horn 11 at its natural resonant frequency. The vibratory energy supplied to the horn is transmitted to the pieces of material being advanced along the table 17 to form a smooth and uniform bond therebetween.

The vibratory motion of the exponential horn 11 tends to produce additional heating thereof because of conduction effects and also as a result of internal loss. In the absence of an arrangement for controlling the temperature of the horn, the horn's longitudinal dimension would increase to produce a comparatively substantial variation in its natural resonant frequency. The expansion of the horn would narrow the operating gap to produce greater pressure on the seam, a non-uniform seam and increased power consumption.

The operation of the foot treadle 62 to close the switch 65 and thereby apply vibratory energy to the horn 11 also is effective to open the switch 60 and thus break the circuit for the heating element 50. The application of heat to the horn is thus arrested simultaneously with the transmission of vibratory energy to the pieces of material to be joined. The blower 40, however, remains in operation and directs a stream of cooling air against the horn. This air circulates freely from the blower discharge conduit 45, across the horn and through the apertures 48 in the side panel 39. The arrangement is such that the horn is maintained at a controlled temperature at all times during the application of vibratory energy to the pieces of material being joined.

The setting of the control rheostat 53 is adjusted such that the predetermined temperature of the horn 11 prior to the sealing operation is substantially equal to the horn's controlled temperature during the application of vibratory energy thereto. The particular temperature at which the horn is maintained both before and during the seaming operation is influenced by various factors, including the ultrasonic resonant frequency for which the apparatus is designed. In several advantageous embodiments, however, the temperature variation of the horn is limited to a range of about 20° F., and the horn vibrates at all times within a frequency range of about plus or minus ten cycles per second from its design resonant frequency. The horn is thereby maintained in comparatively sharp tune during the formation of the seam. Because the natural resonant frequency of the horn and the frequency of the alternating current signal supplied thereto should closely approximate each other and should not vary beyond specific limits, by maintaining the horn's resonant frequency relatively constant the frequency of the applied signal may vary within these limits with better control than has heretofore been considered feasible.

In other advantageous arrangements, particularly in cases in which the matching of the resonant frequency of the horn to that of the applied signal need not be as precise as in the foregoing embodiments, the horn's temperature and resonant frequency may be outside the above ranges.

During the vibration of the horn 11, the resistance to movement of the coil spring 112 is sufficient to hold the anvil 12 in a stationary position. However, in cases in which the amplitude of the upper end of the horn is inadvertently increased above its design amplitude, or when the gap between the horn and the anvil has been set incorrectly, for example, the spring 112 permits limited upward motion of the anvil. With this arrangement, the possibility of substantial wear or other damage to the apparatus is considerably reduced.

Upon the termination of the seaming operation, the foot treadle 62 is released to open the switch 65, thus arresting the vibratory movement of the horn 11, and to close the switch 60. Upon the closing of the switch 60, the heating element 50 is again connected across the alternating current source 55, and the blower unit 40 is effective to direct heated air across the horn to maintain it at its elevated temperature.

In several good embodiments, the pieces of material to be joined are preconditioned by the application of heat as they move along the table 17 prior to their insertion in the gap between the horn 11 and the anvil 12. In the embodiment of FIGURES 1–5, for example, there is provided a pair of opposed heating elements 125 and 126 on the table 17. These elements include substantially flat surfaces which are arranged in juxtaposition with the opposite faces of the material. The elements 125 and 126 serve to heat the material on the infeed side of the gap to a predetermined temperature and are particularly effective in cases in which it is desired to increase the speed of the seaming operation while providing a further improvement in the uniformity of the seam. In addition, in cases in which polyethylene bags, for example, are to be sealed after the bags have been filled with foreign matter, or in other situations where the material includes foreign matter on one or both of its surfaces, the preconditioning of the material prior to seaming substantially eliminates the adverse effect on the uniformity of the seam which might otherwise take place.

Figure 6:
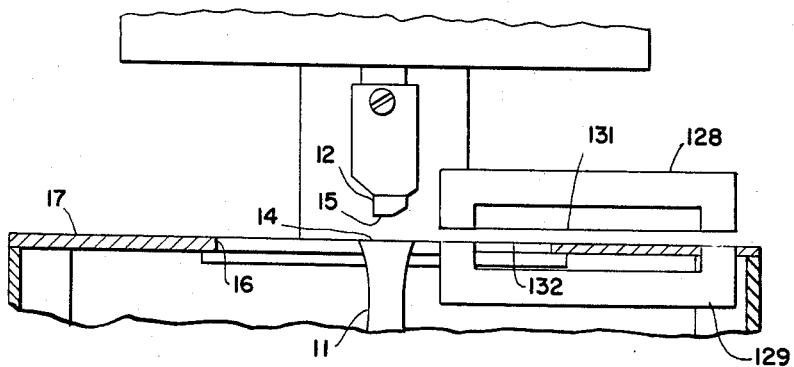
FIGURE 6 is an view in general similar to a portion of FIGURE 1 but illustrating apparatus in accordance with another illustrative embodiment of the invention.

FIGURE 6 is illustrative of an alternative arrangement for preheating the pieces of material prior to their insertion between the tool jaws 11 and 12. In this figure, there are provided two electrically conductive members 128 and 129 which are respectively disposed in juxtaposition with the opposite surfaces of the material. The members 128 and 129 are supported by the table 17 and are each of generally U-shaped configuration. The legs of the members 128 and 129 are interconnected by resistance wires 131 and 132, respectively, which extend in directions parallel to the direction of movement of the material. These wires are supplied from a suitable current source (not shown in FIGURE 6) to apply heat to the material prior to the formation of the seal.

Although the ultrasonic seaming tool is effective to bond together a wide variety of material, particularly good results are achieved in the seaming of synthetic thermoplastic polymeric material in either sheet or woven form. In addition, in some cases pieces of natural material, such as cotton cloth, for example, are ultrasonically interconnected through the use of thermoplastic inserts suitably affixed to their adjacent edges. The apparatus is particularly well suited for joining together various polyethylene materials, such as polyethylene terephthalate, for example, which is exemplified by the material commercially available from E. I. du Pont de Nemours & Co., Wilmington, Del., and sold under its trademark Mylar.

Other polymeric materials with which the apparatus is particularly useful include polyamide polymers, e.g. nylon, polycarbonate polymers, vinyl polymers such as polyvinyl fluoride or polytetrafluoroethylene, for example, and vinylidene. Representative of suitable polymers of this latter class are polymers of vinylidene bromide, vinylidene chlorobromide, vinylidene cyanide and vinylidene halocyanide. These and other monomers also may be co-polymerized to form copolymers such as vinylidene chloride-vinyl chloride, for example.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A method for ultrasonically bonding pieces of material joinable by ultrasonic techniques, said method comprising, in combination, positioning the pieces of material to be joined in an ultrasonic vibratory tool, heating said tool to an elevated temperature, thereafter vibrating said tool at an ultrasonic frequency, to transmit vibratory energy to said pieces and thereby form a bond therebetween, and cooling said tool as it vibrates to maintain the same at a controlled temperature during the application of vibratory energy to said pieces.

2. A method for ultrasonically bonding pieces of material joinable by ultrasonic techniques, said method comprising, in combination, positioning the pieces of material to be joined in an ultrasonic vibratory tool, heating said tool to an elevated temperature, arresting the application of heat to said tool and thereupon vibrating the same at an ultrasonic frequency, to transmit vibratory energy to said pieces and thereby form a bond therebetween, the vibratory motion of said tool tending to produce additional heating thereof, and cooling said tool as it vibrates to maintain the same at a controlled temperature during the application of vibratory energy to said pieces.

3. A method for ultrasonically bonding pieces of material joinable by ultrasonic techniques, said method comprising, in combination, positioning the pieces of material to be joined between a pair of jaws in an ultrasonic vibratory tool, heating one of said jaws to an elevated temperature, arresting the application of heat to said one jaw and simultaneously vibrating the same at an ultrasonic frequency, to transmit vibratory energy to said pieces and thereby form a bond therebetween, the vibratory motion of said one jaw tending to produce additional heating thereof, and cooling said one jaw as it vibrates to maintain the same at a controlled temperature during the application of vibratory energy to said pieces.

4. A method for ultrasonically bonding pieces of material joinable by ultrasonic techniques, said method comprising, in combination, preconditioning the pieces of material by increasing the temperature thereof, positioning said pieces in an ultrasonic vibratory tool, heating said tool to an elevated temperature, arresting the application of heat to said tool and thereupon vibrating the same at an ultrasonic frequency, to transmit vibratory energy to said pieces and thereby form a bond therebetween, the vibratory motion of said tool tending to produce additional heating thereof, and cooling said tool as it vibrates to maintain the same at a controlled temperature during the application of vibratory energy to said pieces.

5. A method for ultrasonically bonding pieces of material joinable by ultrasonic techniques, said method comprising, in combination, positioning the pieces of material to be joined in an ultrasonic vibratory tool, heating said tool to an elevated temperature, thereafter vibrating said tool at an ultrasonic frequency, to transmit vibratory energy to said pieces and thereby form a bond therebetween, the vibratory motion of said tool tending to produce additional heating thereof, and directing cooling air against said tool as it vibrates to maintain the same at a controlled temperature during the application of vibratory energy to said pieces, the elevated temperature of said tool prior to the bonding of said pieces being substantially equal to the controlled temperature thereof during said application of vibratory energy.

6. A method for ultrasonically bonding pieces of material joinable by ultrasonic techniques, said method comprising, in combination, positioning the pieces of material to be joined between a stationary member and a horn in an ultrasonic vibratory tool, heating said horn to an elevated temperature, arresting the application of heat to said horn and thereupon vibrating the same at an ultrasonic frequency, to transmit vibratory energy to said pieces and thereby form a bond therebetween, the vibratory motion of said horn tending to produce additional heating thereof, and directing cooling air against said horn as it vibrates to maintain the same at a controlled temperature during the application of vibratory energy to said pieces, the elevated temperature of said horn prior to the bonding of said pieces being substantially equal to the controlled temperature thereof during said application of vibratory energy.

7. A method for ultrasonically bonding pieces of material joinable by ultrasonic techniques, said method comprising, in combination, preconditioning the pieces of material by increasing the temperature thereof, positioning said pieces in an ultrasonic vibratory tool, heating said tool to an elevated temperature, arresting the application of heat to said tool and thereupon vibrating the same at an ultrasonic resonant frequency, to transmit vibratory energy to said pieces and thereby form a bond therebetween, the vibratory motion of said tool tending to produce additional heating thereof, and cooling said tool as it vibrates to maintain the same at a controlled temperature during the application of vibratory energy to said pieces, the elevated temperature of said tool prior to the bonding of said pieces being substantially equal to the controlled temperature thereof during said application of vibratory energy.

8. A method for ultrasonically bonding pieces of thermoplastic sheet material comprising, in combination, preconditioning the pieces of thermoplastic sheet material by increasing the temperature thereof, positioning the preconditioned pieces between an anvil and a horn-shaped member in an ultrasonic vibratory tool, heating said horn-shaped member to an elevated temperature, arresting the application of heat to said horn-shaped member and thereupon vibrating the same at an ultrasonic frequency, to transmit vibratory energy to said pieces and thereby form a bond therebetween, the vibratory motion of said horn-shaped member tending to produce additional heating thereof, and cooling said horn-shaped member as it vibrates to maintain the same at a controlled temperature during the application of vibratory energy to said pieces, the elevated temperature of said horn-shaped member prior to the bonding of said pieces being substantially equal to the controlled temperature thereof during said application of vibratory energy.

9. A method of the character set forth in claim 8, in which the application of heat to said horn-shaped member is arrested simultaneously with the transmission of vibratory energy to said pieces.

10. Apparatus for ultrasonically bonding pieces of material joinable by ultrasonic techniques, said apparatus comprising, in combination, an ultrasonic vibratory tool having a pair of oppositely disposed jaws, means for positioning the pieces of material to be joined between said jaws, temperature control means in juxtaposition with one of said jaws for heating the same to an elevated temperature, means operatively associated with said one jaw for imparting vibratory oscillations thereto toward and away from the other jaw at an ultrasonic frequency, to transmit vibratory energy to said pieces and thereby form a bond therebetween, the vibratory motion of said one jaw tending to produce additional heating thereof, and means for controlling said temperature control means to cool said one jaw as it vibrates.

11. Apparatus for ultrasonically bonding pieces of material joinable by ultrasonic techniques, said apparatus comprising, in combination, an ultrasonic vibratory tool having a pair of oppositely disposed jaws, means for positioning the pieces of material to be joined between said jaws, temperature control means including a heating element in juxtaposition with one of said jaws for heating the same to an elevated temperature, transducer means operatively associated with said one jaw for imparting vibratory oscillations thereto toward and away from the other jaw at an ultrasonic frequency, to transmit vibratory energy to said pieces and thereby form a bond therebetween, the vibratory motion of said one jaw tending to produce additional heating thereof, and means operable in response to the vibration of said one jaw for controlling said temperature control means to arrest operation of said heating element during the application of vibratory energy to said pieces.

12. Apparatus for ultrasonically bonding pieces of material joinable by ultrasonic techniques, said apparatus comprising, in combination, an ultrasonic vibratory tool having a pair of oppositely disposed jaws, means for positioning the pieces of material to be joined between said jaws, temperature control means adjacent one of said jaws for heating the same to an elevated temperature, transducer means operatively associated with said one jaw for imparting vibratory oscillations thereto toward and away from the other jaw at an ultrasonic resonant frequency, to transmit vibratory energy to said pieces and thereby form a bond therebetween, the vibratory motion of said one jaw tending to produce additional heating thereof, and means operable in response to the vibration of said one jaw for controlling said temperature control means to maintain said one jaw at a controlled temperature during the application of vibratory energy to said pieces, the elevated temperature of said one jaw prior to the bonding of said pieces being substantially equal to the controlled temperature of said one jaw during said application of vibratory energy.

13. Apparatus for ultrasonically bonding pieces of material joinable by ultrasonic techniques, said apparatus comprising, in combination, an ultrasonic vibratory tool having a pair of oppositely disposed jaws, means for positioning the pieces of material to be joined between said jaws, temperature control means including a heating element in juxtaposition with one of said jaws for heating the same to an elevated temperature, transducer means operatively associated with said one jaw for imparting vibratory oscillations thereto toward and away from the other jaw at an ultrasonic frequency, to transmit vibratory energy to said pieces and thereby form a bond therebetween, the vibratory motion of said one jaw tending to produce additional heating thereof, and means operable in response to the vibration of said one jaw for controlling said temperature control means to arrest operation of said heating element and to cool said one jaw as it vibrates, said temperature control means maintaining said one jaw at a controlled temperature during the application of vibratory energy to said pieces, the elevated temperature of said one jaw prior to the bonding of said pieces being substantially equal to the controlled temperature of said one jaw during said application of vibratory energy.

14. Apparatus of the character set forth in claim 13, in which one of said jaws is movable toward and away from the other jaw, and means carried by said tool for urging the movable jaw into resilient engagement with one of the pieces of material to be joined.

15. In apparatus for ultrasonically bonding pieces of thermoplastic material, in combination, an ultrasonic vibratory tool including a vibratory horn, means for positioning the pieces of material to be joined in said tool adjacent said horn, temperature control means including a heating element in juxtaposition with said horn for heating the same to an elevated temperature, transducer means operatively associated with said horn for imparting vibratory oscillations thereto at an ultrasonic resonant frequency, to transmit vibratory energy to said pieces and thereby form a bond therebetween, the vibratory motion of said horn tending to produce additional heating thereof, and means operable in response to the vibration of said horn for controlling said temperature control means to arrest operation of said heating element and to direct cooling air against said horn during the application of vibratory energy to said pieces.

16. In apparatus for ultrasonically bonding pieces of thermoplastic material, in combination, an ultrasonic vibratory tool including a vibratory horn, means for positioning the pieces of material to be joined in said tool in contact with said horn, temperature control means including a heating element in spaced relationship with said horn for heating the same to an elevated temperature, transducer means connected to said horn for imparting vibratory oscillations thereto at an ultrasonic frequency, to transmit vibratory energy to said pieces and thereby form a bond therebetween, the vibratory motion of said horn tending to produce additional heating thereof, and switch means operable simultaneously with the vibration of said horn for controlling said temperature control means to arrest operation of said heating element and to direct cooling air against said horn, said temperature control means maintaining said horn at a controlled temperature during the application of vibratory energy to said pieces, the elevated temperature of said horn prior to the bonding of said pieces being substantially equal to the controlled temperature of said horn during said application of vibratory energy.

17. Apparatus for ultrasonically bonding pieces of thermoplastic material comprising, in combination, an ultrasonic vibratory tool having a pair of oppositely disposed jaws, positioning means for inserting the pieces of thermoplastic material to be joined between said jaws, means including a first heating element adjacent said pieces for preheating the pieces prior to their insertion between said jaws, temperature control means including a second heating element in juxtaposition with one of said jaws for heating the same to an elevated temperature, transducer means operatively associated with said one jaw for imparting vibratory oscillations thereto toward and away from the other jaw at an ultrasonic frequency, to transmit vibratory energy to said preheated pieces and thereby form a bond therebetween, the vibratory motion of said one jaw tending to produce additional heating thereof, and circuit means operable in response to the vibration of said one jaw for controlling said temperature control means to arrest operation of said second heating element during the application of vibratory energy to said pieces.

18. Apparatus of the character set forth in claim 17 comprising, in combination, means including a switching unit for initiating operation of said transducer means to vibrate said one jaw and for simultaneously operating said circuit means to arrest operation of said second heating element.

19. Apparatus for ultrasonically bonding pieces of thermoplastic material comprising, in combination, an ultrasonic vibratory tool having an anvil and an exponential horn in oppositely disposed spaced-apart relationship with each other, adjustment means for moving said anvil with respect to said horn to establish a predetermined gap therebetween, means for positioning the pieces of material to be joined in said gap, means including first and second heating elements respectively disposed adjacent opposite faces of said material for preheating said material prior to the insertion of said pieces in said gap, temperature control means including a third heating element in juxtaposition with said horn for heating the same to an elevated temperature, means operatively associated with said horn for imparting vibratory oscillations thereto toward and away from said anvil at an ultrasonic resonant frequency, to transmit vibratory energy to said preheated pieces of material and thereby form a bond therebetween, the vibratory motion of said horn tending to produce additional heating thereof, and means operable in response to the vibration of said horn for controlling said temperature control means to arrest operation of said third heating element and to cool said horn as it vibrates, said temperature control means maintaining said horn at a controlled temperature during the application of vibratory energy to said pieces, the elevated temperature of said horn prior to the bonding of said pieces being substantially equal to the controlled temperature of said horn during said application of vibratory energy.

20. Apparatus of the character set forth in claim 19, in which said adjustment means includes means for effecting both a coarse adjustment and a fine adjustment of the position of said anvil with respect to said horn, and a stop member for preventing movement of said anvil toward said horn to a position closer than the position establishing said predetermined gap.

21. Apparatus for ultrasonically bonding pieces of material joinable by ultrasonic techniques, said apparatus comprising, in combination, an ultrasonic vibratory tool having a pair of oppositely disposed jaws, means for positioning the pieces of material to be joined between said jaws, temperature control means including an air blower and a heating element in juxtaposition with one of said jaws for heating the same to an elevated temperature, transducer means electrically connected to said one jaw for imparting vibratory oscillations thereto toward and away from the other jaw at an ultrasonic frequency, to transmit vibratory energy to said pieces and thereby form a bond therebetween, the vibratory motion of said one jaw tending to produce additional heating thereof, and means operable in response to the vibration of said one jaw for controlling said temperature control means to arrest operation of said heating element and to direct a stream of cooling air from said blower against said one jaw as it vibrates.

References Cited
UNITED STATES PATENTS

| | | | |
|---|---|---|---|
| 3,022,814 | 2/1962 | Bodine | 156—73 |
| 2,946,119 | 7/1960 | Jones et al. | |
| 3,184,353 | 5/1965 | Balamuth et al. | 156—73 |

PHILIP DIER, *Primary Examiner.*